(12) United States Patent
Saito (10) Patent No.: US 10,289,095 B2
(45) Date of Patent: May 14, 2019

(54) WIRE ELECTRIC DISCHARGE MACHINING SYSTEM

(71) Applicant: FANUC Corporation, Yamanashi (JP)

(72) Inventor: Shunichi Saito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/387,801

(22) Filed: Dec. 22, 2016

(65) Prior Publication Data

US 2017/0185065 A1    Jun. 29, 2017

(30) Foreign Application Priority Data

Dec. 24, 2015 (JP) .................... 2015-252127

(51) Int. Cl.
*G05B 19/402* (2006.01)
*B23H 11/00* (2006.01)
(Continued)

(52) U.S. Cl.
CPC ........... *G05B 19/402* (2013.01); *B23H 11/00* (2013.01); *B25J 15/0253* (2013.01); *B25J 15/04* (2013.01);
(Continued)

(58) Field of Classification Search
CPC ........ G05B 19/402; G05B 2219/39484; G05B 2219/39468; G05B 2219/37582;
(Continued)

(56) References Cited

U.S. PATENT DOCUMENTS 4,359,815 A * 11/1982 Toyoda .............. B23Q 3/15713
414/225.01
4,897,586 A * 1/1990 Nakata .................. G05B 19/42
318/568.16
(Continued)

FOREIGN PATENT DOCUMENTS

JP      S60180726 A    9/1985
JP      61-8224 A      1/1986
(Continued)

OTHER PUBLICATIONS

Office Action in JP Application No. 2015-252127, dated Jan. 30, 2018, 7 pp.
(Continued)

*Primary Examiner* — Ramesh B Patel
(74) *Attorney, Agent, or Firm* — Hauptman Ham, LLP (57) ABSTRACT

A wire electric discharge machining system according to the present invention includes: a wire electric discharge machine that relatively moves a wire electrode and a workpiece to be machined according to a program, and subjects the workpiece to be machined to electric discharge machining by the wire electrode; at least one hand; a robot which mounts the hand on a head of an arm, and operates an object to be operated; and a visual sensor that detects a position of a machined workpiece in a machining tank, which has been cut from the workpiece to be machined by the electric discharge machining, wherein the robot performs an operation of removing the machined workpiece from the machining tank, based on the position of the machined workpiece, which has been detected by the visual sensor.

10 Claims, 4 Drawing Sheets

(51) Int. Cl.
  *B25J 15/02* (2006.01)
  *B25J 15/04* (2006.01)
  *B25J 19/02* (2006.01)
  *B23H 7/02* (2006.01)

(52) U.S. Cl.
  CPC ............... *B25J 19/023* (2013.01); *B23H 7/02* (2013.01); *G05B 2219/37555* (2013.01); *G05B 2219/37582* (2013.01); *G05B 2219/39468* (2013.01); *G05B 2219/39484* (2013.01); *G05B 2219/45043* (2013.01)

(58) Field of Classification Search
  CPC . G05B 2219/37555; G05B 2219/45043; B25J 15/0253; B25J 19/023; B25J 15/04; B23H 11/00; B23H 7/02
  See application file for complete search history.

(56) References Cited

U.S. PATENT DOCUMENTS

| | | | | |
|---|---|---|---|---|
| 5,038,011 A * | 8/1991 | Nakayama | ............... | B23H 7/02 219/69.12 |
| 5,885,199 A * | 3/1999 | Shao | .................... | B23F 17/006 29/27 C |
| 6,008,636 A * | 12/1999 | Miller | .................... | G01R 31/01 324/757.01 |
| 7,565,223 B2 * | 7/2009 | Moldenhauer | ......... | B23H 11/00 219/69.12 |
| 2006/0065546 A1 * | 3/2006 | Curodeau | ................ | B23H 1/04 205/640 |
| 2007/0284216 A1 * | 12/2007 | Meier | .................. | B23Q 7/1431 198/346.2 |
| 2008/0240511 A1 * | 10/2008 | Ban | ......................... | B25J 9/1697 382/108 |
| 2013/0054025 A1 * | 2/2013 | Ito | ........................... | B25J 9/1697 700/246 |
| 2015/0197009 A1 * | 7/2015 | Melikian | ................ | B25J 9/1664 700/259 |

FOREIGN PATENT DOCUMENTS

| | | |
|---|---|---|
| JP | 2006-194705 A | 7/2006 |
| JP | 2013-43271 A | 3/2013 |

OTHER PUBLICATIONS

Extended European Search Report in EP Application No. 16204724.5, dated Mar. 24, 2017.

* cited by examiner

WIRE ELECTRIC DISCHARGE MACHINING SYSTEM

RELATED APPLICATIONS

The present application claims priority to Japanese Patent Application Number 2015-252127, filed Dec. 24, 2015, the disclosure of which is hereby incorporated by reference herein in its entirety.

BACKGROUND OF THE INVENTION

1. Field of the Invention

The present invention relates to a wire electric discharge machining system.

2. Description of the Related Art

When machining is performed continuously for a long time, or an unattended operation is performed by a wire electric discharge machine that is combined with a manipulator such as a robot which automatically changes a workpiece to be machined, a machined workpiece needs to be automatically removed that has been cut from the workpiece to be machined during machining. In the case where the cut machined workpiece drops in a machining tank and is left therein, there is the possibility that the machined workpiece interferes with a movable portion of a lower electrode in the machining tank, and is caught between the movable portion and the machining tank to damage a component in the machining tank.

As a method for automatically removing the cut machined workpiece, an apparatus is disclosed that has an arm which can move back and forth and up and down and has the wire electric discharge machine itself mounted thereon, pulls up a cut down portion by an electromagnet or an adsorption pad at an arm head, and removes the cut down portion, as is disclosed in Japanese Patent Laid-Open No. 60-180726, for instance.

In order for the apparatus in Japanese Patent Laid-Open No. 60-180726 to remove the cut machined workpiece, it is a prerequisite for the apparatus to hold the machined workpiece so that the machined workpiece does not drop from the workpiece to be machined after having been cut, but such a method as to solve the problem is not described in Japanese Patent Laid-Open No. 60-180726. However, in machined workpieces that have been cut by the wire electric discharge machine, there is a machined workpiece having such a shape as to drop into the machining tank when having been cut, and in such a case, there has been a problem that the apparatus disclosed in Japanese Patent Laid-Open No. 60-180726 cannot collect the machined workpiece.

SUMMARY OF THE INVENTION

Then, an object of the present invention is to provide a wire electric discharge machining system that can collect a machined workpiece even though the machined workpiece has been cut from the workpiece to be machined and has dropped at the time of wire electric discharge machining.

A wire electric discharge machining system according to the present invention includes: a wire electric discharge machine that relatively moves a wire electrode and a workpiece to be machined according to a program, and subjects the workpiece to be machined to electric discharge machining by the wire electrode; at least one hand; and a robot which mounts the hand on a head of an arm, and operates an object to be operated, wherein the wire electric discharge machining system is further provided with a visual sensor that detects a position of a machined workpiece in a machining tank of the wire electric discharge machine, which has been cut from the workpiece to be machined by the electric discharge machining; and the robot performs an operation of removing the machined workpiece from the machining tank, based on the position of the machined workpiece, which has been detected by the visual sensor.

The wire electric discharge machining system according to the present invention has a hand that is used for both of an operation of changing the workpiece to be machined and the operation of removing the machined workpiece.

The wire electric discharge machining system according to the present invention has at least a hand for the workpiece to be machined for performing the operation of changing the workpiece to be machined, and a hand for the machined workpiece for performing the operation of removing the machined workpiece; and is provided with an automatic hand changing device for selectively mounting any one of the hands for each of the operations thereon.

The wire electric discharge machining system according to the present invention has a plurality of types of hands for the machined workpieces; and is provided with an automatic hand changing device for selectively mounting any one of the hands according to a material of the machined workpiece, a shape of the machined workpiece or an environment in which the machined workpiece exists.

Furthermore, in the wire electric discharge machining system according to the present invention, the hand is provided with a sensor which detects that the hand has come in contact with the machined workpiece or has grasped the machined workpiece.

The wire electric discharge machining system according to the present invention includes correcting the position of the machined workpiece, which has been detected by the visual sensor, based on an angle of the visual sensor with respect to a liquid surface of a machining liquid that fills the machining tank, and on a refractive index of the machining liquid with respect to air.

In the wire electric discharge machining system according to the present invention, the visual sensor is mounted on the head of the arm of the robot together with the hand.

The wire electric discharge machining system in the present invention recognizes the position of the machined workpiece that has been cut, by the visual sensor, and automatically removes the cut machined workpiece; and thereby enables the reduction of the number of man-hours, or continuous unattended machining.

In addition, the wire electric discharge machining system temporarily places the taken out machined workpiece on a table or the like, and detects the machined workpiece by the visual sensor again; and thereby can check that the target machined workpiece has been removed.

BRIEF DESCRIPTION OF THE DRAWINGS

The above-described and other objects and features according to the present invention will become apparent from the description of the following embodiment with reference to the attached drawings. Among those figures.

DETAILED DESCRIPTION OF THE PREFERRED EMBODIMENTS

Embodiments according to the present invention will be described below with reference to the drawings.

Figure 1:
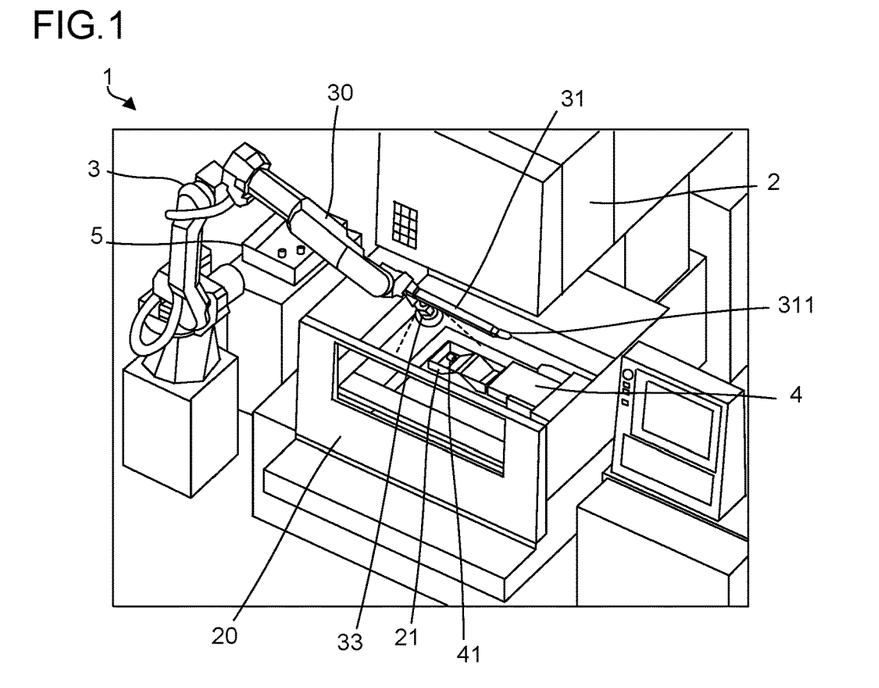
FIG. 1 is a schematic block diagram of a wire electric discharge machining system according to one embodiment of the present invention.

FIG. 1 is a view showing a schematic structure of a wire electric discharge machining system according to one embodiment of the present invention. The wire electric discharge machining system 1 according to the present embodiment includes: a wire electric discharge machine 2 that subjects a workpiece 4 to be machined to electric discharge machining; and a robot 3.

The wire electric discharge machine 2 is a machining machine that subjects the workpiece 4 to be machined to the electric discharge machining, which is placed on a work stage (unillustrated) in the machining tank 20 that is filled with a machining liquid. In the wire electric discharge machine 2, a control device (unillustrated) is built or arranged together. The control device controls a plurality of servo motors (unillustrated) that drive a wire electrode (unillustrated) and the work stage respectively according to a program, and moves a relative position between the wire electrode and the workpiece 4 to be machined; and also controls a potential difference between the wire electrode and the workpiece 4 to be machined, thereby generates an electric discharge, and thereby subjects the workpiece 4 to be machined to the electric discharge machining by the wire electrode. In the machining tank 20, a tray 21 is arranged that receives the machined workpiece 41 which has been cut from the workpiece 4 to be machined and has dropped.

The robot 3 is an apparatus that performs an operation of changing the workpiece 4 to be machined with respect to the wire electric discharge machine 2 and the operation of removing the machined workpiece 41 which has been cut from the workpiece 4 to be machined by the electric discharge machining, and is controlled by a robot controller (unillustrated), based on a robot program concerning the changing operation and the removing operation. The robot controller is connected to the control device of the wire electric discharge machine 2 by cable or radio communication, and executes an action concerning the changing operation or an action concerning the removing operation, based on a command sent from the wire electric discharge machine 2.

When executing the action concerning the operation of removing the machined workpiece 41, the robot 3 mounts a hand 31 for the machined workpiece and a visual sensor 33 for detecting the machined workpiece 41 in the machining tank 20, on a head of the arm 30 by an automatic hand changing device or the like. The robot 3 scans the whole region of the machining tank 20 with the visual sensor 33 from above the machining tank 20, acquires visual information, and determines a position of the machined workpiece 41, based on the visual information. As for a method of determining the position of the machined workpiece 41 from the visual information, a general image-recognition technique is used. For instance, it is acceptable that information concerning a shape of the machined workpiece 41 and information concerning a color thereof are previously sent from the control device and are stored in the robot controller which controls the robot 3, and the robot controller matches the information concerning the shape of the machined workpiece 41 with the visual information, and thereby detects the position of the machined workpiece 41, or it is also acceptable as an easier method that the robot controller finds out a region of the color of the machined workpiece 41 which has approximately the same size as that of the machined workpiece 41, from the inside of the visual information, and thereby detects the position of the machined workpiece 41.

Figure 2:
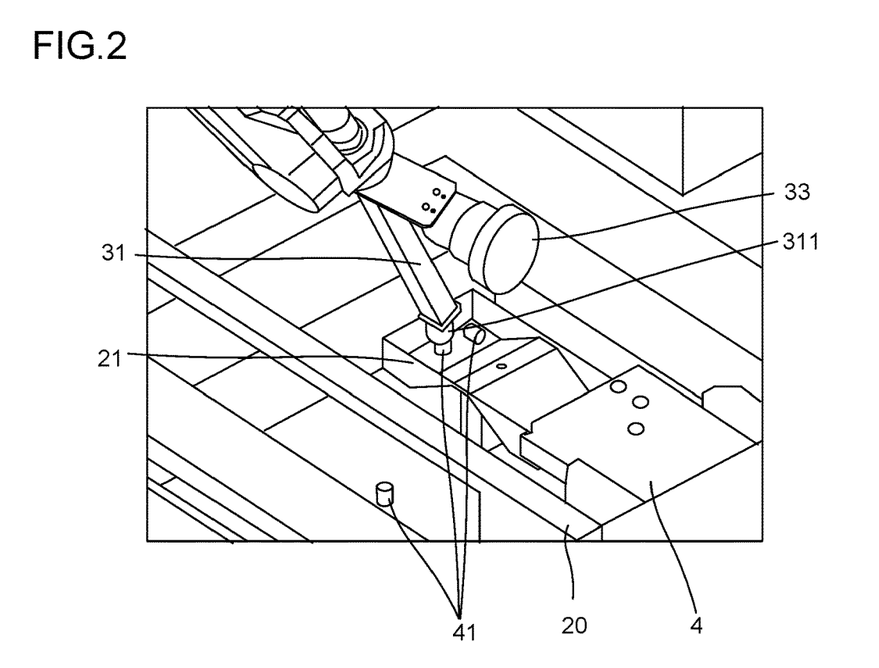
FIG. 2 is a view showing a state in which a robot 3 takes out a machined workpiece 41 from the inside of a machining tank 20, by using a hand 31 for the machined workpiece, in the wire electric discharge machining system 1.

FIG. 2 is a view showing a state in which the robot 3 takes out the machined workpiece 41 of which the position has been determined from the inside of the machining tank 20 by using the hand 31 for the machined workpiece. As for one example, an electromagnet 311 is provided on the head of the hand 31 for the machined workpiece; and the robot 3 holds the machined workpiece 41 at the head of the hand 31 for the machined workpiece due to a magnetic force of the electromagnet 311, takes out the machined workpiece 41 from the inside of the machining tank 20, and temporarily places the taken out machined workpiece 41 on a temporary placing table that is arranged in the vicinity of the robot 3. As is illustrated in the figure, the machined workpiece 41 that has been cut from the workpiece 4 to be machined drops onto the tray 21 in the machining tank 20, but there is a case where the machined workpiece 41 drops onto the bottom of the machining tank 20 by dropping out of the tray 21, or the like. In any case, the robot 3 can take out the machined workpiece 41 of which the position has been detected by the visual sensor 33, by using the hand 31 for the machined workpiece. Incidentally, it is desirable that the hand 31 for the machined workpiece is structured so as to have a sufficient length in comparison with a depth of the machining tank 20. By structuring the hand 31 in the above way, the robot 3 can control the visual sensor 33 so as not to enter the inside of the machining tank 20, when taking out the machined workpiece 41; and accordingly the visual sensor 33 does not interfere with the tray 21, the workpiece 4 to be machined and the like, and even in a case where the machining tank 20 is filled with the machining liquid, the visual sensor 33 does not result in being immersed in the machining liquid when the machined workpiece 41 is taken out.

Figure 3:
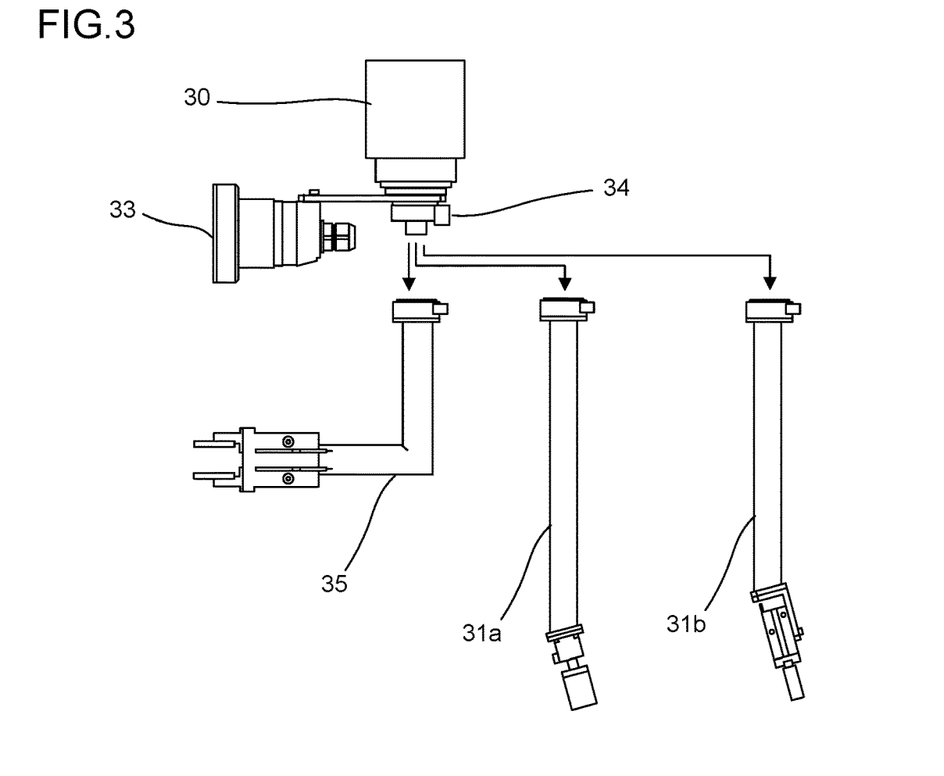
FIG. 3 is a schematic block diagram showing a head of an arm 30 of the robot 3.

FIG. 3 is a view showing a schematic structure of a head of the arm 30 of the robot 3. A hand changer 34 is provided on the head of the arm 30 together with the visual sensor 33, and is structured so as to be capable of automatically changing a plurality of types of hands 31 for machined workpieces, which are properly used according to a quality of a material of the machined workpiece 41, a shape of the machined workpiece 41 and an environment in which the machined workpiece 41 exists (liquid quality of machining liquid in machining tank 20, and the like), with a hand 35 for changing a workpiece to be machined, which is used for the operation of changing the workpiece 4 to be machined, under the control of the robot controller that controls the robot 3. As for examples of the plurality of types of the hands 31 for the machined workpieces, there are the hand 31a for the machined workpiece, which holds the machined workpiece 41 through the above described electromagnet, the hand 31*b* for the machined workpiece, which grasps the machined workpiece 41 through the chuck, and the like.

Figure 4:
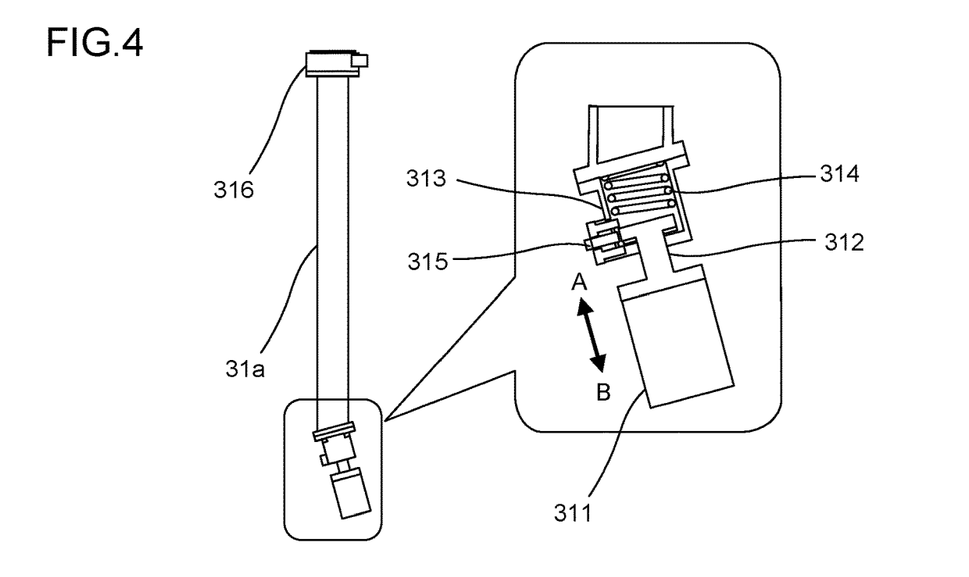
FIG. 4 is a schematic block diagram of a hand 31a for a machined workpiece, which holds the machined workpiece 41 through an electromagnet.

FIG. 4 is a schematic block diagram of the hand 31*a* for the machined workpiece, which holds the machined workpiece 41 through the electromagnet. A hand changer 316 is provided in the base side of the hand 31*a* for the machined workpiece, which holds the machined workpiece 41 through the electromagnet, and is structured so as to be capable of being attached to and detached from the hand changer 34 existing at the head of the arm 30, according to the control of the robot controller which controls the robot 3. In addition, a cylindrical portion 313 is provided in a head side, and a supporting portion 312 which supports the electromagnet 311 is inserted into the head of the cylindrical portion 313 so as to be capable of moving in a direction of the arrow A-B in FIG. 4. In addition, a spring 314 is arranged in the inside of the cylindrical portion 313, and always pushes the supporting portion 312 toward a direction of the arrow B in FIG. 4 by a force of repulsion. Reference numeral 315 denotes a proximity sensor that detects an approach of the supporting portion 312.

When holding the machined workpiece 41 by this hand 31*a* for the machined workpiece, which holds the machined workpiece 41 through the electromagnet, the robot 3 presses the electromagnet 311 existing at the head of the hand 31*a* for the machined workpiece, toward a position of the machined workpiece 41, which the robot 3 has determined based on the visual sensor 33, in a state in which the robot controller controls the robot 3, and thereby the electromagnet 311 and the supporting portion 312 move toward the direction of the arrow A in FIG. 4 by a reaction force. In addition, the proximity sensor 315 detects the movement of the supporting portion 312; thereby the robot controller which controls the robot 3 detects that the electromagnet 311 has been pressed to the machined workpiece 41, and turns the electromagnet 311 on; and the robot 3 holds the machined workpiece 41.

Figure 5:
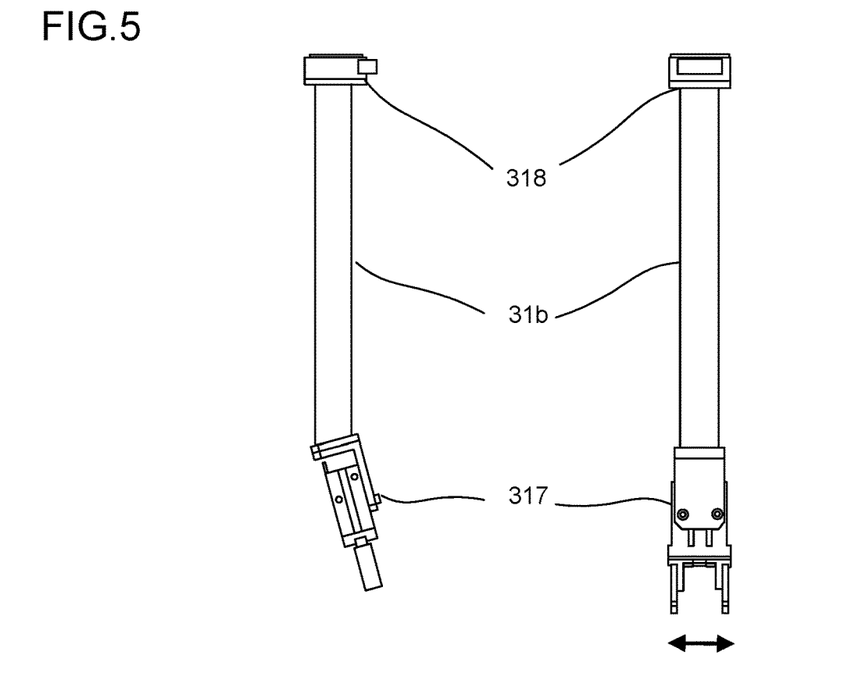
FIG. 5 is a schematic block diagram of a hand 31b for a machined workpiece, which grasps the machined workpiece 41 through a chuck.

FIG. 5 is a schematic block diagram of the hand 31*b* for the machined workpiece, which grasps the machined workpiece 41 through a chuck. A hand changer 318 is provided in the base side of the hand 31*b* for the machined workpiece, which holds the machined workpiece 41 through the chuck, and is structured so as to be capable of being attached to and detached from the hand changer 34 existing at the head of the arm 30, according to the control of the robot controller which controls the robot 3. In addition, the chuck 317 is provided in the head side, which opens/closes in a direction of the arrow in FIG. 5, and the chuck 317 is provided with a sensor (unillustrated) that detects that the chuck 317 has nipped the object when having been closed.

When holding the machined workpiece 41 by this hand 31*b* for the machined workpiece, which grasps the machined workpiece 41 through the chuck, the robot 3 moves the chuck 317 existing at the head of the hand 31*b* for the machined workpiece, toward a position of the machined workpiece 41, which the robot 3 has determined based on the visual sensor 33, in the state in which the robot controller controls the robot 3, and closes the chuck. In addition, the sensor detects that the chuck 317 has nipped the object, and thereby the robot controller detects that the chuck 317 has grasped the machined workpiece 41.

Figure 6:
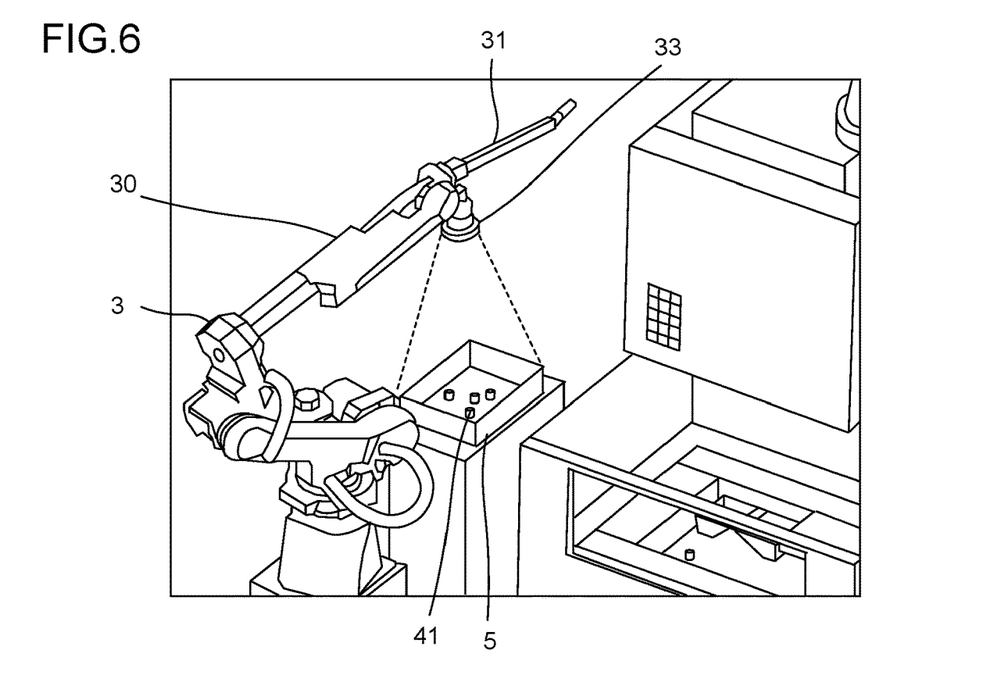
FIG. 6 is a view showing a state in which a visual sensor 33 detects the machined workpiece 41 again that has been taken out from the machining tank 20, in the wire electric discharge machining system 1 in FIG. 1.

FIG. 6 is a view showing a state in which the visual sensor 33 that has been mounted on the arm 30 of the robot 3 detects the machined workpiece 41 again that has been placed on a temporary placing table 5. Thus, it is also possible that the robot 3 uses the visual sensor 33 not only for detecting the position of the machined workpiece 41 in the machining tank 20, but also for detecting the taken out machined workpiece 41 again, and that the robot controller thereby checks again that the robot 3 has removed the target machined workpiece 41 from the inside of the machining tank 20, and checks the quality of the machined workpiece 41, and the like.

Figure 7:
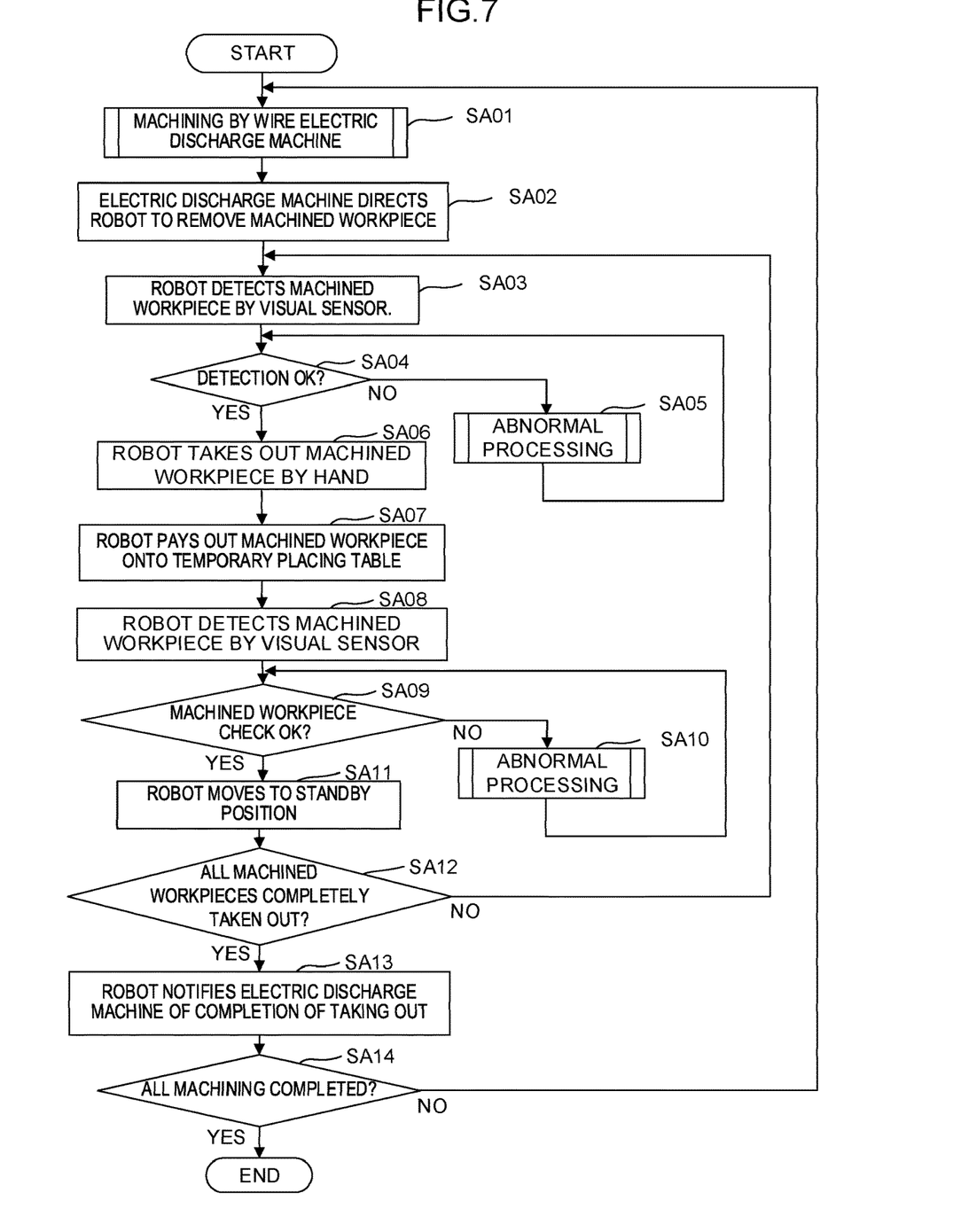
FIG. 7 is a flow chart showing actions of the wire electric discharge machining system 1 in FIG. 1.

FIG. 7 is a flow chart showing a flow of actions of the wire electric discharge machining system of the present embodiment.

[Step SA01] The control device that controls the wire electric discharge machine 2 controls the wire electric discharge machine 2 according to a program, thereby the workpiece 4 to be machined is subjected to the electric discharge machining, and the machined workpiece 41 is cut out from the workpiece 4 to be machined. The machined workpiece 41 drops on the tray 21 or the bottom of the machining tank 20.

[Step SA02] From the control device that controls the wire electric discharge machine 2, a command of the operation of removing the machined workpiece 41 is output to the robot controller which controls the robot 3. In the output command, information such as the type (shape or the like) and the number of the machined workpieces is contained.

[Step SA03] The robot 3 starts the removing operation of removing the machined workpiece 41 from the machining tank 20 under the control of the robot controller. Firstly, the robot 3 scans the whole region of the machining tank 20 with the visual sensor 33, and determines the positions of each of the machined workpieces 41 in the machining tank 20.

[Step SA04] The robot controller determines whether or not the machined workpiece 41 has been detected from the inside of the machining tank 20. When the machined workpiece has been detected, the processing shifts to a step SA06, and when the machined workpiece has not been detected, the processing shifts to a step SA05.

[Step SA05] The robot controller executes abnormal processing at the time when the machined workpiece 41 cannot have been detected. As for examples of the abnormal processing, there are a retry that is carried out after a detection condition has been changed, a notification to an operator, which warns that the machined workpiece 41 cannot have been detected, and the like.

[Step SA06] Based on the position of the machined workpiece 41 in the machining tank 20, which has been detected in the step SA04, the robot controller controls the robot 3 to use the hand 31 for the machined workpiece that is mounted on the head of the arm 30, and to take out the machined workpiece 41 from the machining tank.

[Step SA07] The robot controller controls the robot 3, and pays out the machined workpiece 41 that has been taken out in the step SA06, onto the temporary placing table 5.

[Step SA08] The robot controller controls the robot 3, and detects the machined workpiece 41 again that has been paid out onto the temporary placing table 5 in the step SA07, by the visual sensor 33.

[Step SA09] The robot controller determines whether or not the shape and the like of the machined workpiece 41 are normal that has been detected in the step SA08 again. When the machined workpiece 41 is normal that has been detected again, the processing shifts to a step SA11, and when the machined workpiece 41 has not been normal, the processing shifts to a step SA10.

[Step SA10] The robot controller executes abnormal processing at the time when the machined workpiece 41 has not been normal that has been detected again. As for examples of the abnormal processing, there are a retry that is carried out after a detection condition has been changed, a notification to an operator, which warns that the machined workpiece was abnormal, and the like.

[Step SA11] The robot controller controls the robot 3 so as to move to a standby position.

[Step SA12] The robot controller determines whether or not all of the machined workpieces 41 have been taken out that are objects of the removing operation which has been commanded from the control device in the step SA02. When the taking out operation has been completed, the processing shifts to a step SA13, and when the taking out operation is not completed, the processing shifts to the step SA03.

[Step SA13] The robot controller notifies the control device which controls the wire electric discharge machine 2 that the removing operation has been completed.

[Step SA14] The control device of the wire electric discharge machine 2 determines whether or not the electric discharge machining of the workpiece 4 to be machined based on the program has been completed. When the electric discharge machining has been completed, the present processing ends, and when the electric discharge machining is not completed, the processing shifts to the step SA01, and the electric discharge machining of the workpiece 4 to be machined based on the program is continued.

In the above description, the embodiment of the present invention has been described. However, the present invention is not limited only to the above described embodiment, but appropriate changes can be added thereto, and thereby the present invention can be performed in various forms.

For instance, in the above described embodiment, the hand 35 for changing the workpiece to be machined and the hand 31 for the machined workpiece are prepared, respectively, and the prepared hands have been changed and used according to the operation which the robot 3 performs, but it is also acceptable to prepare a dual-purpose hand which serves for both of the hand 35 for changing the workpiece to be machined and the hand 31 for the machined workpiece, and use one dual-purpose hand in both of the operation of changing the workpiece to be machined and the operation of removing the machined workpiece.

When the visual sensor 33 detects the inside of the machining tank 20, there is a case where the machining liquid is not discharged.

In this case, such a method is used that the robot controller which controls the robot 3 previously stores a refractive index of the machining liquid with respect to air therein, the robot 3 makes the visual sensor 33 take an image of the inside of the machining tank 20 from a plurality of previously determined positions at an angle smaller than an angle perpendicular to the machining liquid surface, and the robot controller determines the position of the machined workpiece 41 from the taken image. The robot controller corrects a position of the machined workpiece 41 in the machining tank 20, which is determined from the taken image, based on the angle with respect to the liquid surface of the machining liquid, at the time when the visual sensor 33 has taken the image, the height of the machining liquid surface in the machining tank 20, the refractive index of the machining liquid with respect to air, and the like, and calculates a correct position of the machined workpiece 41 in the machining tank 20; and the robot 3 removes the machined workpiece 41 existing in the calculated position from the inside of the machining tank 20, by the hand 31 for the machined workpiece.

In addition, when the above described method is used, it is also acceptable that the robot controller stores a plurality of refractive indices of the machining liquids with respect to air so that the refractive indices correspond to the types and the components of the respective machining liquids, and corrects the position of the machined workpiece 41 in the machining tank 20, which is determined from the taken image with the use of the refractive indices according to the types and the components of the machining liquids to be supplied to the machining tank 20 at the time of the electric discharge machining.

Furthermore, in the above described embodiment, the visual sensor 33 is mounted on the head of the arm 30 of the robot 3 together with the hand 31 for the machined workpiece and is used, but the visual sensor 33 may be mounted at any position as long as the visual sensor 33 can recognize the inside of the machining tank 20. For instance, it is acceptable to fixedly mount a plurality of visual sensors on the edges of the machining tank 20 so that the visual sensors detect the machined workpiece 41 in the machining tank 20; or to mount a visual sensor on an arm of a robot different from the robot that has had the hand 31 for the machined workpiece mounted thereon, and use the visual sensor.

In the above description, the embodiment of the present invention has been described. However, the present invention is not limited to the examples in the above described embodiment, but appropriate changes can be added thereto, and thereby the present invention can be performed in various forms.

The invention claimed is:

1. A wire electric discharge machining system, comprising:
   a wire electric discharge machine configured to
      relatively move a wire electrode and a workpiece to be machined according to a program, and
      subject the workpiece to be machined to electric discharge machining by the wire electrode;
   at least one hand;
   a robot having an arm, the hand being mounted on a head of the arm of the robot; and
   a visual sensor configured to detect a position of a machined workpiece in a machining tank of the wire electric discharge machine, wherein
   the machined workpiece has been cut from the workpiece to be machined by the electric discharge machining, and
   the robot is configured to perform, by using the hand, an operation of removing the machined workpiece dropped into the machining tank from the machining tank, based on the position of the machined workpiece, which has been detected by the visual sensor.

2. The wire electric discharge machining system according to claim 1, wherein
   the at least one hand comprises a dual-purpose hand for performing both of an operation of changing the workpiece to be machined and the operation of removing the machined workpiece.

3. The wire electric discharge machining system according to claim 1, wherein
   the at least one hand comprises:
      a hand for the workpiece to be machined for performing an operation of changing the workpiece to be machined; and
      a hand for the machined workpiece for performing the operation of removing the machined workpiece; and
   the wire electric discharge machining system further comprises an automatic hand changing device for selectively mounting thereon any one of the hands for each of the operations.

4. The wire electric discharge machining system according to claim 1, wherein
the at least one hand comprises a plurality of hands of different types for different machined workpieces; and
the wire electric discharge machining system further comprises an automatic hand changing device for selectively mounting any one of the hands according to
a material of the machined workpiece,
a shape of the machined workpiece, or
an environment in which the machined workpiece exists.

5. The wire electric discharge machining system according to claim 1, wherein
the hand is provided with a sensor configured to detect that the hand has come in contact with the machined workpiece or has grasped the machined workpiece.

6. The wire electric discharge machining system according to claim 1, further comprising:
a controller configured to correct the position of the machined workpiece, which has been detected by the visual sensor, based on
an angle of the visual sensor with respect to a liquid surface of a machining liquid that fills the machining tank, and
a refractive index of the machining liquid with respect to air.

7. The wire electric discharge machining system according to claim 1, wherein
the visual sensor is mounted on the head of the arm of the robot together with the hand.

8. The wire electric discharge machining system according to claim 1, further comprising:
a tray, in the machining tank, for receiving machined workpieces which have been cut from the workpiece to be machined.

9. The wire electric discharge machining system according to claim 8, wherein
the visual sensor is configured to detect
a machined workpiece that has been cut from the workpiece to be machined and dropped onto the tray in the machining tank, and
the machined workpiece which has been cut from the workpiece to be machined but dropped out of the tray onto a bottom of the machining tank.

10. The wire electric discharge machining system according to claim 1, wherein
the robot is configured to perform the operation of removing the machined workpiece while avoiding submerging the visual sensor in a machining liquid that fills the machining tank.

* * * * *